UNITED STATES PATENT OFFICE.

JOHN A. JUST, OF SYRACUSE, NEW YORK, ASSIGNOR TO THE NATIONAL PACKAGE COMPANY, OF GLENS FALLS, NEW YORK.

FIBROUS COMPOSITION OF MATTER.

SPECIFICATION forming part of Letters Patent No. 666,807, dated January 29, 1901.

Application filed June 29, 1900. Serial No. 22,034. (No specimens.)

*To all whom it may concern:*

Be it known that I, JOHN A. JUST, a citizen of the United States, and a resident of Syracuse, in the county of Onondaga and State of New York, have invented a new and useful Improvement in Fibrous Compositions of Matter, of which the following is a specification.

This invention relates to that class of hard and tough fibrous compositions of matter which are composed mainly of a finely-divided fibrous substance and a fusible cementing ingredient, such as rosin, which ingredients are united in a well-known manner by subjecting the dry fluffy mixture to heat and pressure.

The object of this invention is to increase the toughness and the wearing and waterproof qualities of this kind of compositions.

My improved composition consists of finely divided or reduced fibrous matter, a mineral filler, resinous matter, and a drying-oil containing an oxidizing ingredient.

In practicing my invention I prepare the resinous material preferably by combining lime or some other base with rosin in such proportions as to produce a resinate of the lime or other base combined with or dissolved in an excess of rosin. Lime combines with rosin in about the proportion of one part, by weight, of lime to five parts of rosin, forming calcium resinate or resinate of lime. I prefer, however, to use an excess of rosin, about one part of lime to twenty parts of rosin, in which case the calcium resinate is dissolved in the excess of rosin. I prefer an excess of rosin because it lowers the melting-point of the mixture somewhat, the melting-point of the pure resinate being rather higher than is desirable. The lime can be mixed with the rosin by dusting slaked lime upon the surface of the melted rosin or by grinding or tumbling the rosin together with the lime and then heating the mixture until the rosin is melted and the lime absorbed. Milk of lime may be used instead of slaked lime, in which case the water is driven off as steam by the heat of the melted rosin. The melting-point of the composition can be regulated by changing the proportion of lime, a greater proportion of lime raising the melting-point. I add to the melted rosin a drying-oil containing an oxidizing ingredient—for instance, linseed-oil containing in one gallon from two to six ounces of borate of manganese and from two to three ounces of acetate of lead. The drying-oil can be employed in various proportions ranging from five to twenty per cent. of the rosin, according to the desired degree of induration. The fiber and mineral filler are added to the melted resinous matter and drying-oil and thoroughly mixed therewith, so that every particle of fiber is thoroughly coated with the resinous and oily matter and the interstices are completely filled by the filler. The mixture is now allowed to cool and harden and then crushed or otherwise reduced to a loose fluffy condition, which allows the mixture to be molded by heat and pressure in the usual manner into articles of the desired form.

Instead of calcium resinate some other suitable resinate may be employed—for instance, aluminium resinate or iron resinate. The aluminium resinate can be prepared by saponifying rosin with an alkali, diluting the rosin-soap with water, adding a solution of aluminium sulfate, and washing and drying the precipitated aluminium resinate. This resinate is also preferably used with an excess of rosin—for instance, one part, by weight, of aluminium resinate to ten parts of rosin.

If an iron resinate is desired, the rosin-soap is treated with iron sulfate, whereby iron resinate is precipitated.

The fibrous material which is employed may vary in accordance with the available supply and the cost of the material and the character of the articles which are to be produced. Waste paper, cornstalks, bagasse, palmetto-root, and other vegetable substances may be employed, as well as mineral substances—for instance, asbestos or mica. The fibrous material is reduced in any suitable manner to a fine fluffy or flocky condition.

Any suitable mineral filler may be employed—for instance, ground or pulverized gypsum, plaster-of-paris, burnt and ground clay, or the like.

The fiber, filler, and resinous matter are mixed in any suitable proportion, which may vary more or less according to the ingredients which are employed and the goods which are produced. When a mineral fibrous material is employed, the proportion of mineral filler can be greatly reduced. For the manufacture of hollow ware a composition is well adapted which consists, by weight, of about twenty-four parts of fibrous matter, sixteen parts of mineral filler, nineteen parts of resinous matter, and two parts of oil containing a drier.

If a pigment is used for coloring the composition, it should be mixed with the rosin while the latter is in a melted condition.

My improved fibrous composition is very desirable for the manufacture of hollow ware—for instance, barrels, kegs, pails, butter-tubs—and also for the manufacture of many other articles for which a hard and tough material is required.

I claim as my invention—

1. The herein-described composition of matter consisting of finely-divided fibrous material, a mineral filler, resinous matter, a drying-oil and a drier, substantially as set forth.

2. The herein-described composition of matter consisting of finely-divided fibrous material, a mineral filler, a resinate, rosin, a drying-oil and a drier, substantially as set forth.

Witness my hand this 21st day of June, 1900.

JOHN A. JUST.

Witnesses:
WILSON R. HARE,
DANIEL H. STRACHAN.